United States Patent [19]
Fracas et al.

[11] Patent Number: 5,450,152
[45] Date of Patent: Sep. 12, 1995

[54] COMBINATION MACHINE FOR DEVELOPING AND PRINTING PHOTOGRAPHIC MATERIAL CONTINUOUSLY AND AUTOMATICALLY

[75] Inventors: Franco Fracas; Giosué Franci; Giuseppe Ronzani, all of Pordenone, Italy

[73] Assignee: San Marco Imaging S.r.l., Pordenone, Italy

[21] Appl. No.: 197,700

[22] Filed: Feb. 17, 1994

[30] Foreign Application Priority Data

Feb. 18, 1993 [IT] Italy .............................. PN93U0003

[51] Int. Cl.⁶ .............................................. G03D 13/00
[52] U.S. Cl. ...................................................... 354/297
[58] Field of Search .............................. 354/319–324, 354/297; 355/27–29, 100, 106

[56] References Cited

U.S. PATENT DOCUMENTS

| | | | |
|---|---|---|---|
| 4,185,912 | 1/1980 | Schwartz | 354/322 X |
| 4,864,354 | 9/1989 | Crasnianski | 354/322 X |
| 4,864,355 | 9/1989 | Knecht et al. | 355/27 |
| 5,307,114 | 4/1994 | Nitsch et al. | 355/29 |

*Primary Examiner*—D. Rutledge
*Attorney, Agent, or Firm*—Wenderoth, Lind & Ponack

[57] ABSTRACT

A machine (3) for developing and printing photographic material continously and automatically is composed of modules (4, 5, 6, 7) allowing easy mutual assembly and separation. The basic structure of such a machine comprises a module (4) for printing from film onto paper surmounting a print developing module (5). The print developing module is in turn positioned alongside a module (6) housing devices by which prints emerging from the developing module (5) are dried, as well as containers holding the liquids used to regenerate and replenish various chemical treatment baths. An additional module (7) for developing film can be positioned on top of the drier module (6). The print module (4) is also hinged at the bottom along one side or the outer edge of the module (5) below in such a way as to tilt clear and allow easy access to the inside of the machine (3) for the purposes of cleaning and servicing.

7 Claims, 2 Drawing Sheets

COMBINATION MACHINE FOR DEVELOPING AND PRINTING PHOTOGRAPHIC MATERIAL CONTINUOUSLY AND AUTOMATICALLY

BACKGROUND OF THE INVENTION

1. Field of the Invention

The present invention relates to a machine for the combined developing and printing of photographic material.

2. State of the Prior Art

The prior art embraces automatic machines capable of developing exposed photographic films and printing the images from developed films onto light-sensitive paper, all of which is carried out continuously. Machines of the type in question find use principally in photographic laboratories where large quantities of photographic material are developed and printed. Such machines require skilled and properly trained staff, and they typically have substantial dimensions that dictate a need for a considerable amount of space.

There has been a trend in recent years for general photographic developing and printing services to be offered even by commercial enterprises with no claim to specialization in this particular field, for example stationers, department stores, etc. endeavoring to offer a comprehensive service, though often with limited space at their disposal, and without especially skilled staff.

To meet such demands, multifunctional automatic machines have been designed in which the developing and printing stages are incorporated into a single unit. However, these machines still tend either to be bulky, and therefore unsuitable for installation in the spaces that are typically available, or lacking in flexibility of use, able to produce only the more familiar commercial sizes of print, being prevented by limited space from handling larger items, such as 30×45 cm. For this type of business, which if retained would be a great advantage to the user, given the notable added value attached, films must still be sent to specialized laboratories. Further negative aspects of these machines are to be found in their monolithic structure. In effect, the typical casing almost invariably presents an obstacle to the replacement of units or devices such as the film developing unit, the printing unit, and the print developing unit, when found to fall short of the performance required, or in the event of changes to the processing method. More exactly, units designed and built to perform single specific functions will be of characteristic shapes and dimensions that turn out, in practice, to be incompatible with those of other units, and thus must be separated from one another, with the result that additional space is taken up. If designed and built to be incorporated into an overall system, on the other hand, such units would be effectively fixed, permitting no modifications or adaptation whatever, and still having significantly large dimensions. Especially in the case of monolithic types of structure, servicing operations are rendered troublesome, because even the simplest of inspections can involve a laborious dismantling of a great many of the panels making up the outer casing of the machine.

OBJECT AND SUMMARY OF THE INVENTION

It would therefore be desirable, and such indeed is the principal object of the present invention, to provide a combination type machine for continuously and automatically developing and printing photographic material that is particularly compact and composed of easily assembled modular unit. This benefits the user by its rational occupation of a notably limited space, by an advantageous flexibility and simplicity of use, an easier execution of servicing operation, and a simple and convenient alteration of the overall configuration to adapt the performance of the machine to new or changing user requirements. Such a machine also permits rationalizing the organization of manufacturing operations by unifying production line, reducing storage space requirements, and simplifying and streamlining the management of stock inventories. These and other object besides are realized, according to the invention, in a machine as characterized in the appended claims.

BRIEF DESCRIPTION OF THE DRAWINGS

The features and advantages of the machine according to the invention will now be described in detail, strictly by way of example, with reference to the accompanying drawings of one embodiment, in which.

DETAILED DESCRIPTION OF THE PREFERRED EMBODIMENT

Figure 1:
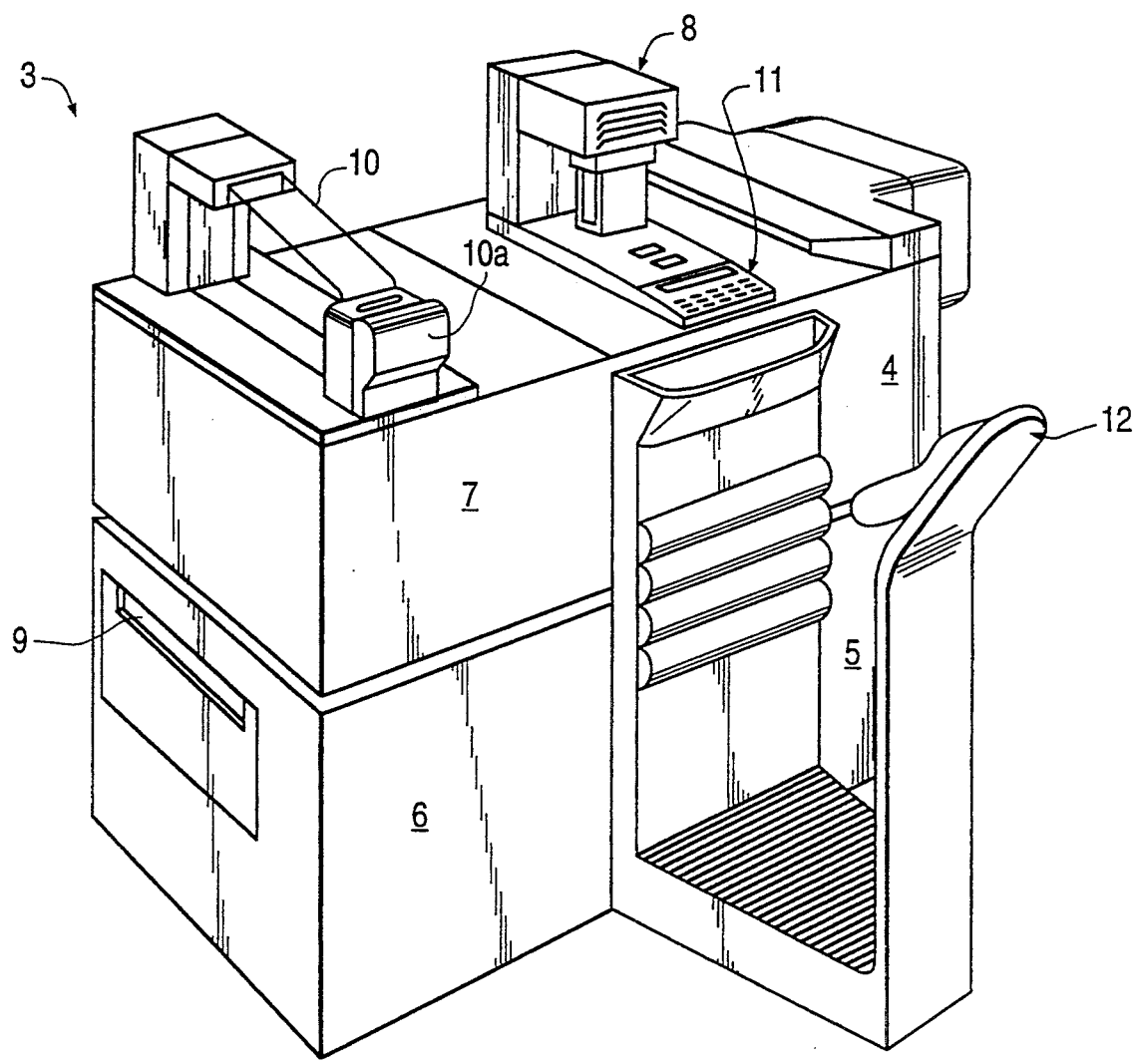
FIG. 1 is a perspective view of a machine according to the invention.

Referring in particular to FIG. 1, it will be observed that a machine 3 according to the present invention is composed substantially of four modular compartments respectively accommodating:

- a print unit or module 4, comprising a device by which images are projected from film onto light-sensitive paper, the images being interposed between the device and the paper;
- a unit or module 5 by which the exposed light-sensitive paper is developed;
- a unit or module 6 by which the developed light-sensitive paper is dried, and which holds a supply of liquids used to regenerate and replenish the chemical treatment baths; and
- a unit or module 7, internally of which the photographic film is developed and dried.

The print module 4 is equipped, in a conventional manner, with an optical system 8 by which negative film images are projected onto sheets of light-sensitive paper. Likewise conventionally, the print module 4 comprises a focusing lens and a device whose function is to analyze the percentage balance of the three primary colors in the negative and to control the selection of filtration and illumination parameters for a correct reproduction of the image.

The light-sensitive paper is developed in the module 5 located beneath the print module 4. The exposed sheet of paper is received by this module 5 from the print module 4 above and caused to pass through chemical treatment baths, and then transferred in its final printed and developed state by means of conventional roller conveyor devices into the adjacent drying and storage module 6.

Inside the drying and storage module 6, the sheet of paper received from the developing module 5 is subjected to blasts of warm air before ultimately being ejected from the machine by way of a slot 9.

The film is developed internally of the module 7, designed to surmount the module 6 by which the prints are dried and in which the regenerating and replenishing liquids are stored. This module 7 comprises, in a conventional manner, a plurality of vessels containing chemical treatment baths.

The photographic film developing module 7 will also be typically equipped with such devices as are necessary to control the time the film remains in the different baths, and the temperature, agitation, filtration, replenishment and recovery of the developer solutions. The film is directed through the succession of vessels containing the various chemicals by suitable conveyor devices, and then washed, dried and deposited finally in a tray 10 positioned on the topmost surface of the machine 3 on the rear of a loading unit 10a.

The machine 3 is further equipped with conventional automatic replenishing systems capable of monitoring the consumption and gradual depletion of the various chemical treatment baths and making up the deficit from containers of the corresponding liquids mounted in the storage section of the module 6.

It will be observed that the devices mentioned above, all of which are conventional, are advantageously housed in single compartments or modules, and that each such module is a self-contained unit.

The modules are assembled in a removable association, each connected with the next by means of conventional mechanical and electrical devices.

By virtue of this arrangement, the machine 3 according to the invention can incorporate a variety of modules to suit the requirements of the individual user.

The basic configuration of the machine 3 might consist, for example, of a print module 4, a developing module 5 and a print drying module 6 also accommodating reserve supplies of regenerating and replenishing liquids.

If requested by the user, the same basic machine could be further equipped with the module 7 for developing and drying photographic film.

FIG. 1 shows devices 11 at the front of the machine 3 for controlling and displaying the various functions, and adjacent to these devices, a seat 12 for the operator who oversees the correct operation of the machine 3.

The seat 12 is of an ergonomic design which ensures the comfort of the operator during the time spent at the controls of the machine.

A further advantage of the machine 3 according to the present invention consists in the fact that the casing of the print module 4 is mounted in such a way as to facilitate servicing operations.

Figure 2:
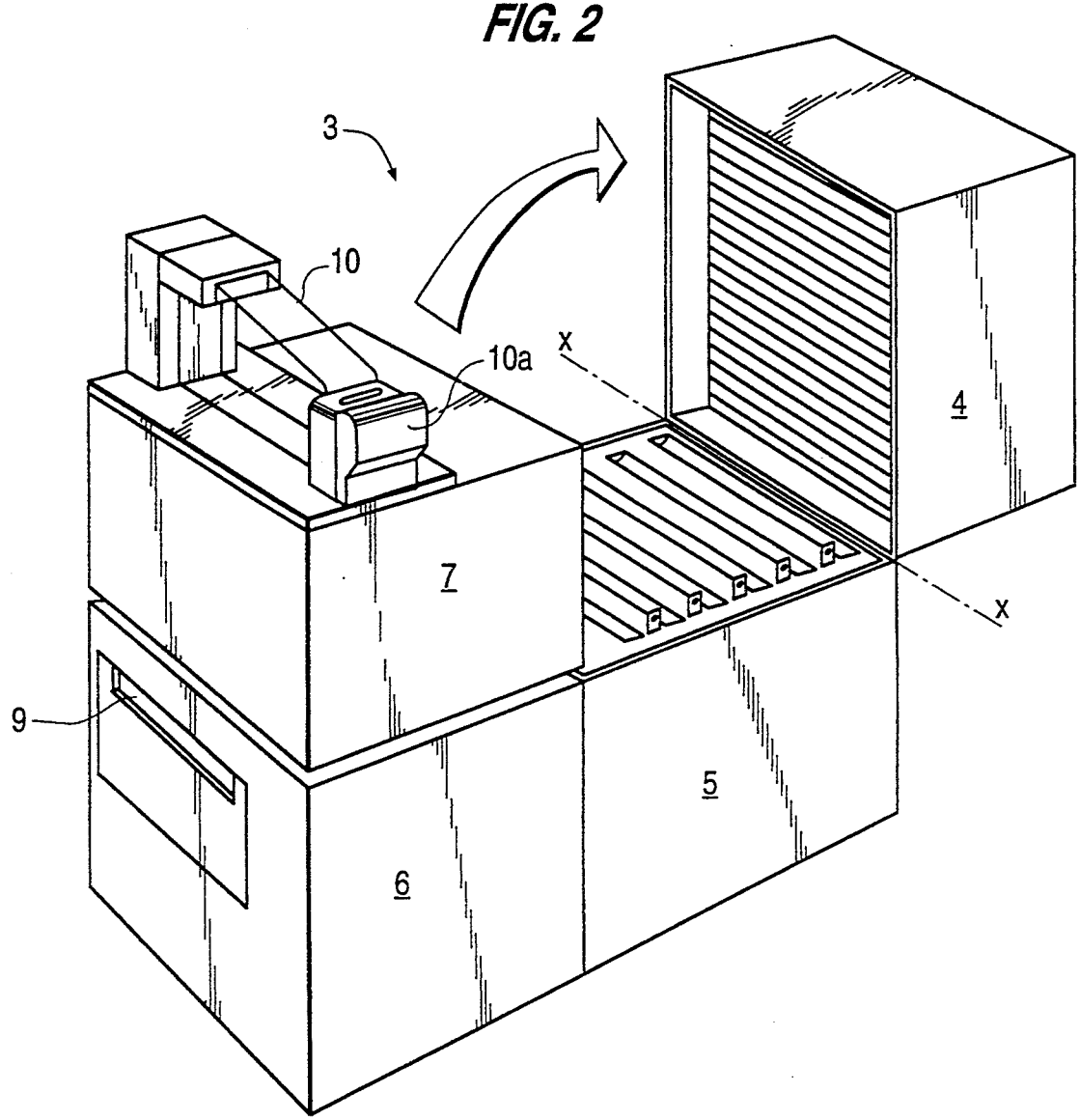
FIG. 2 is a view of identical to that of FIG. 1, but with the machine in a position allowing maintenance.

More exactly, the shorter outermost side of the module is hinged along the bottom edge about a horizontal axis, denoted x—x, extending along the adjacent side wall of the machine (see FIG. 2).

The casing is thus able to rotate clockwise, as viewed by the operator, affording access to internal parts of the machine 3 and facilitating the routine cleaning and maintenance operations performed on these same internal parts.

It will be evident from the foregoing that key objects are realized in a machine 3 according to the invention, namely a notable compactness which allows the user a rational exploitation of limited space, the facility of selecting and altering the overall composition and even component parts by replacing the original modules with other modules more suitable or technologically more evolved, as well as a notable flexibility of use and conspicuous ease of maintenance. In addition, the particular architecture disclosed also allows a notable rationalization of industrial manufacturing procedures. In effect, the type of modular assembly features in the machine 3 allows a user to effect an easy replacement, even on site, of those devices which may be discerned as inadequate when measured against the characteristics of the photographic material to be handled (quantity, chemical composition, etc.) or when assessing the user's own working requirements. Similarly, the makers of such machines are able to streamline their production and to manufacture the various modules for stock in readiness for assembly, at the moment of ordering, in response to the requirements of the individual purchaser.

Finally, the expedient of incorporating at least one hinged casing, such as that of the print module 4 in the example illustrated, has the effect of simplifying and greatly facilitating the cleaning and servicing operations that need to be performed periodically on the machine 3.

Advantageously, the print module 4, and naturally the successive modules 5 and 6 by which the prints are developed and dried, will be proportioned in such a manner as to operate with sheets of light-sensitive paper that have dimensions greater than those of the more familiar commercial sizes, so that the machine 3 will also be able to handle larger photographic prints, for example 30×45 cm, which cannot be produced by conventional machines of comparable dimensions, but only by machines of the type installed in specialized laboratories, whose services the user would otherwise need to employ. Such a facility clearly allows the user to significantly and profitably extend the performance of the machine, given the ability to respond directly and swiftly to the requests for this type of processing which are often advanced by customers, and which carry a considerable added value. Evidently, variations in the embodiment might be applied to the machine 3 according to the invention without abandoning the scope of the foregoing specification and accompanying drawings, or straying from the bounds of protection afforded by the appended claims.

We claim:

1. A machine arrangement comprising:
   a photographic film developing and drying unit for developing and drying photographic film, said unit being singly accommodated inside a first modular casing;
   a printing unit for printing an image on a film onto a sheet of light-sensitive paper, and said printing unit being singly accommodated inside a second modular casing;
   a developing unit for developing the light-sensitive paper, said developing unit being singly accommodated inside a third modular casing; and
   a drying unit for drying the light-sensitive paper, said drying unit being singly accommodated inside a fourth modular casing;
   wherein said units, accommodated in their respective modular casings, are removably associated with one another by mechanical and electrical devices.

2. The machine of claim 1, wherein said second and third modular casings define a machine sidewall adjacent thereto, and said second modular casing having said printing unit accommodated therein is in a position surmounting said third modular casing having said developing unit accommodated therein and tiltably mounted relative to said third modular casing for rotation about a horizontal axis that extends along said machine sidewall.

3. The machine arrangement of claim 1, wherein said printing unit has an optical system mounted thereon.

4. The machine arrangement of claim 1, wherein said photographic film developing and drying unit has a film tray and a loading unit thereon.

5. The machine arrangement of claim 1, wherein said first modular casing surmounts said fourth modular casing, and said second modular casing surmounts said third modular casing.

6. A machine arrangement comprising:
- a photographic film developing and drying unit for developing and drying photographic film;
- a film tray associated with said photographic film developing and drying unit;
- a loading unit associated with said photographic film developing and drying unit;
- a printing unit for printing an image on a film onto a sheet of light-sensitive paper, said unit comprising a device for analyzing an image to ensure accurate reproduction thereof;
- an optical system associated with said developing unit for projecting negative film images onto the light-sensitive paper;
- a developing unit for developing the light-sensitive paper;
- a drying unit for drying the light-sensitive paper;
- wherein each of said units are accommodated in respective modular casings that are removably associated with one another by mechanical and electrical devices.

7. The machine arrangement of claim 6, wherein said film tray and said loading unit are located on an upper surface of said first modular casing, and wherein said optical system is located on an upper surface of said printing unit.

* * * * *